May 19, 1953      F. D. M. GAMBLE      2,639,137
AUTOMATIC WEIGHING GEAR

Filed Sept. 1, 1949      2 Sheets-Sheet 1

Inventor
Frederick D.M. Gamble,
by Hall & Houghton
Attorneys.

Patented May 19, 1953

2,639,137

UNITED STATES PATENT OFFICE 2,639,137

AUTOMATIC WEIGHING GEAR

Frederick David Minors Gamble, London, England, assignor of one-half to Samuel Williams & Sons, Limited, London, England Application September 1, 1949, Serial No. 113,541
In Great Britain September 6, 1948

8 Claims. (Cl. 265—28)

This invention relates to automatic weighing gear and more particularly, though not exclusively, to gear for weighing loads lifted by a crane for excluding the tare weight of the lifting appliance and for automatically integrating these weights over a number of lifts within a high degree of accuracy, e. g. plus or minus ½% on the net weight of the load.

The invention consists in automatic weighing embodying features as set out in the claims appended hereto.

Figure 1:
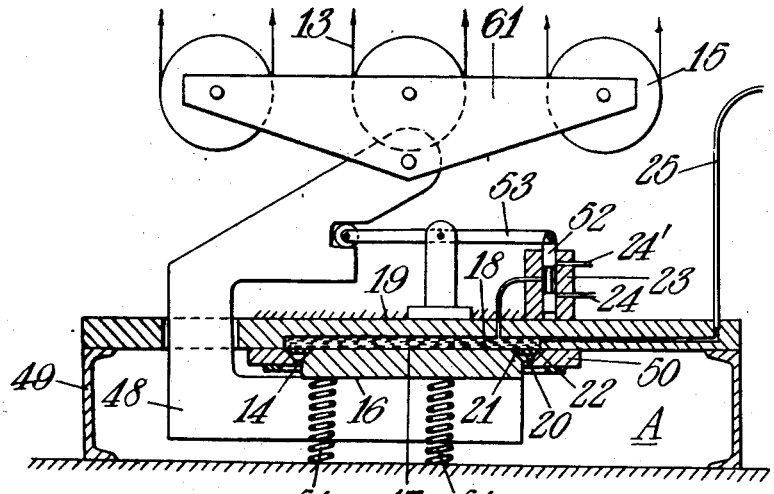
Figure 1A:
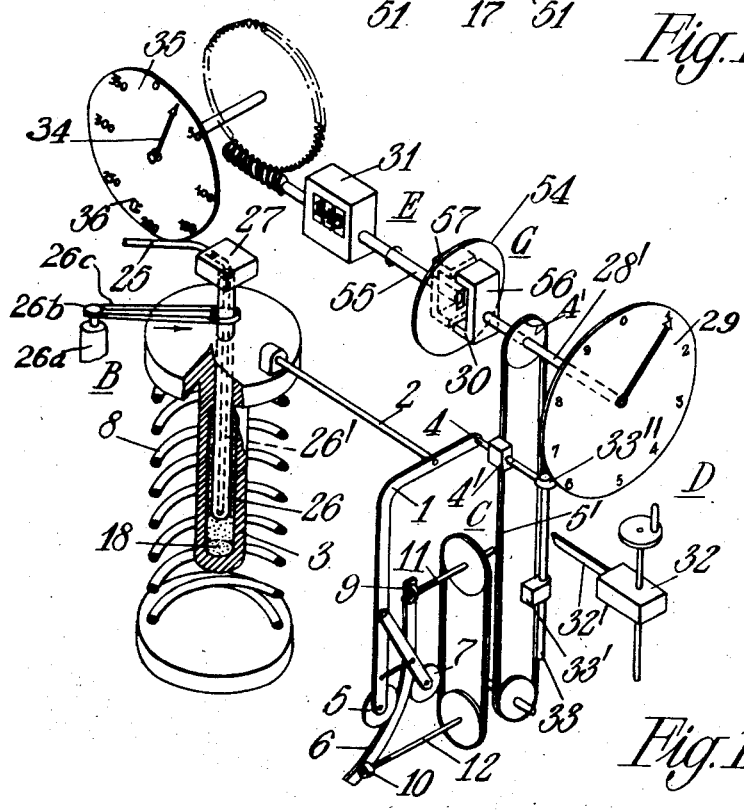
Figure 2:
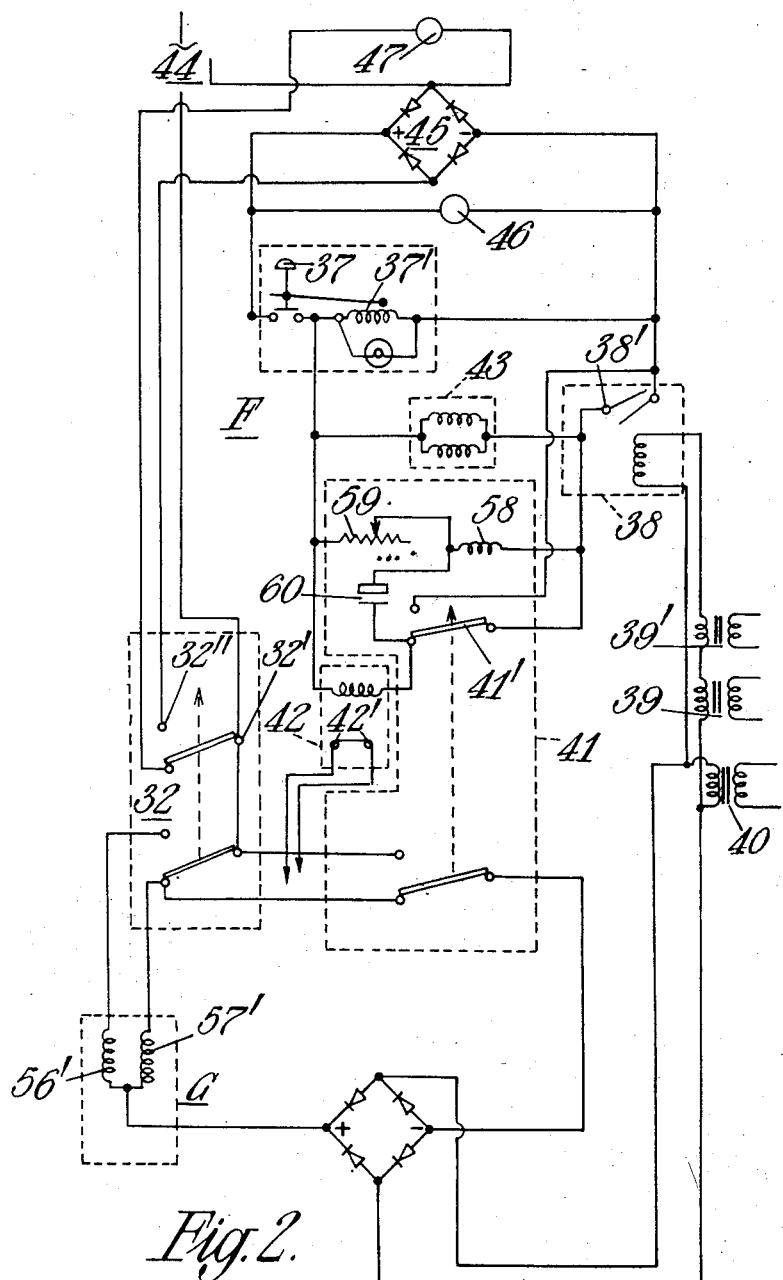

Referring to the accompanying diagrammatic drawings:

Figures 1 and 1a are perspective views illustrating part of an automatic weighing gear incorporating the present invention, and Figure 2 is an electrical diagram illustrating a convenient arrangement of control unit for employment therewith.

In carrying the invention into effect according to one convenient form illustrated by way of example in Figures 1-2 as applied to weighing gear for weighing loads lifted by a crane, we provide a load balancing unit A, a weighing unit B, compensating apparatus C, means for deducting the tare weight from gross load D, weight integrating apparatus E and an electrical control unit F.

Load balancing unit

The crane hoisting ropes 13 are made to pass over sheaves 15 (known as weighing sheaves) and the reaction from these is taken through saddle 48 and the load balancing unit A to the crane structure 49. The load balancing unit A consists of piston 16 which is restrained from rising under the influence of the pull exerted through the saddle 48 by diaphragm 17 held in contact with piston 16 by pressure of oil 18. The annular gap between the piston 16 and the wall of the cylinder 19 is bridged by a series of small discs, annular sector pieces, or a complete annulus 20 having radial slots around its inner or outer periphery to promote flexibility to support the diaphragm 17 over the annular gap.

The effective area of the combination of piston 16 and annular supports 20 will vary slightly if the piston is moved in or out of the cylinder 19. The said annular supports 20 are therefore made to rest on abutment surfaces 21 and 22 formed in the piston 16 and clamping ring 50 respectively, allowing a slight movement about the position when the diaphragm is flat without appreciable variation of the effective area. By suitable design of said surfaces a movement of the piston corresponding to a tipping of the annular supports 20 through an angle of plus or minus 5° can be accommodated without any appreciable variation in effective area.

In order that the annular supports 20 should not take any side thrust, the piston 16 is constrained from moving radially by means of a flexible metal spider 14 which is designed to promote free axial movement.

The two or more springs 51 counterbalance the weight of the sheaves 15, beam 61, saddle 48 and piston 16 so that the smallest load on the crane ropes 13 will produce a corresponding increase in the pressure exerted on the oil 18.

When a load being sustained by the load balancing unit A is increased oil will flow via a pipe 25 of substantial cross section to the weighing cylinder B (Fig. 1a) thus allowing the piston 16 to move upwards into the cylinder 19. A relay valve 23 is secured to the fixed structure of the crane having a moving piston 52 which opens and closes ports 24 and 24' according to the position of the piston 16 relative to the cylinder 19, this movement being transferred through a lever 53 or similar linkage. When the piston 16 has discharged some of the oil from the cylinder 19 the valve piston 52 will have uncovered the port 24 which receives a supply of oil from a continuously running pump (not shown) which maintains a pressure in excess of that necessary to support the maximum load the load balancing unit will accommodate. Thus oil is pumped through port 24 into the cylinder 19 until the diaphragm 17 is once again approximately flat. At this point valve piston 52 shuts off the flow of oil from the pump by again covering port 24.

When the load on the ropes 13 is removed the oil pressure in the system will be in excess of that required to balance the load and oil will flow back from the weighing cylinder unit B into the load balancing unit A, thus forcing the piston 16 downwards in relation to the cylinder 19. This movement is transferred to the valve piston 52 which now uncovers port 24' allowing oil to discharge to a reservoir (not shown) feeding the pump. After sufficient oil has been returned to the reservoir to leave the diaphragm 17 approximately flat, the piston 52 closes port 24' and stops the discharge of oil.

Weighing cylinder unit

This consists of a fixed piston 26 and a concentrically axially movable cylinder 3. Pressure of the oil 18 is transmitted through a longitudinal passage 26' in the piston 26 and tends to push the cylinder 3 off the piston 26, the cylinder being restrained by a spring 8. The movement of the cylinder 3 corresponds approximately to the pressure of the oil 18 in the load balancing unit.

In order to minimise friction effects, the piston 26 is made to rotate at a constant speed by means of an electric motor 26a the shaft of which carries a pulley 26b driving a belt 26c engaging the piston 26 and an oil seal 27 is provided between the incoming oil supply pipe 25 and the upper end of the rotating piston 26. The effective area of the piston, the length of the stroke and the oil pressure are adjusted in practice so that a considerable force and movement are available to operate the mechanisms which are described below.

Compensating apparatus

In view of the high degree of accuracy required by an automatic weighing gear of high precision, it would be very expensive to produce a spring 8 commercially having an accuracy falling within the desired limits. If the spring 8 departs from the specified rate or has not a constant rate over its movement, then the movement of the cylinder 3 will not be in the correct ratio to the gross crane load. This effect is compensated according to one feature of the present invention by means of a bell crank lever 1 which has its pivot axis 2 fixed in relation to the cylinder 3. One end of the bell crank lever 1 carries a pair of guide spools 5 and 7 which are situated one on each side of a fixed compensator bar 6, the other end of the bell crank 1 having indicating and integrating mechanisms 29, E, G, 35, associated with it by means of a bar 4.

Assuming the axis of the cylinder 3 and piston 26 to be vertical as shown, then the bell crank lever 1 is arranged with the axis of the arm carrying the guide pulleys 5 and 7 roughly vertical. If the compensator bar 6 were straight and vertical, then the bar 4 of the bell crank lever 1 connected to the indicating mechanism would move in step with the cylinder 3, but if the compensator bar 6 is set at an angle to the vertical or is otherwise shaped as shown, the bell crank 1 will move about its axis as it moves up or down the compensator bar 6. This bar is suitably shaped to compensate for the departure of the spring 8 from the specified rate.

The apparent load on the weighing sheaves 15 is affected by the weight of rope between these sheaves and the load, this weight varying with the height of the load and the amount the crane jib is luffed in or out. To compensate these effects the ends of the compensator bar 6 embody screw threaded lugs 9 and 10 which have horizontal screws 11 and 12 running in them.

The two screws are geared together and run in synchronism with the hoisting and if necessary luffing motions also of the crane in such a manner that the compensator bar is moved bodily in a horizontal plane to correct for the variations of weight of rope between the load and the weighing sheaves 15. In order that the two motions of hoisting and luffing can be transmitted to the pair of screw threads a differential gear (not shown) is employed.

Means of deducting tare weight from gross load and weight integrating apparatus In order that this portion of the apparatus be explained, it is necessary to understand the operation of the complete weighing mechanism.

The integrator 31 consists of a cyclometer type counter indicating, say, 10 tons for each turn of a spindle 55 (Fig. 1a).

Assume that a load of 5 tons is lifted by a lifting appliance weighing 3 tons.

When the lifting appliance rests on the ground the load balancing unit has only the weight of rope to create pressure on the oil 18 by means of the compensator gear C the movement of the weighing cylinder 3 produced by pressure of the oil 18 is deducted automatically by the opposing movement of the bell crank lever 1. A rigid rod 4 at the end of the lever 1 is connected at 4' to a chain 5' whereby vertical motions of the rod are converted to rotary motion of a pointer shaft 28' associated with a dial 29 such that one revolution of the pointer = 10 tons. Under these conditions the pointer would show zero.

As the load is lifted the pointer will move until it shows 5+3=8 tons on the dial.

By means of an electrical clutch G the integrator shaft 55 is now connected to the shaft 28' of pointer 28, this operation being initiated by an operator's push button 37.

The operator then deposits the load and the pointer will travel towards zero. When it reaches the tare weight (3 tons) the electrical clutch G is disconnected from the pointer spindle 28'.

Thus the integrator has travelled the difference between 8 tons and 3 tons = 5 tons, being the net weight of the load. This process is repeated and on each occasion a load is lifted and deposited, the integrator moving to an extent corresponding to the net load lifted and thus indicating the total load deposited from the time of its being set to zero.

Since integrator 31 is only connected to the pointer shaft 28' on the return stroke of the weighing cylinder 3 the additional friction due to the integrator in no way affects the accuracy of weighing.

Two electrical combinations are mentioned above, one to connect the integrator 31 to the pointer shaft 28' and the other to disconnect it. The former operation will be explained below under the heading Electrical Control Gear and the latter employs the device for deducting the tare weight from the gross load.

In order to disengage the clutch G of a clutch-brake device at the correct instant it is necessary for an electrical contact to operate when the pull on the weighing sheaves 15 corresponds to the tare weight only. This operation of the electrical contact is accomplished by positioning a tare switch 32 (Fig. 1a) in appropriate vertical position relative to the bar 4 such that the head 33" of a gravity actuated rod 33 which latter slides in a fixed guide 33' and normally rests on the end 32' of the switch 32, is lifted off the switch at the correct instant by the bar 4 as the cylinder 3 moves upwards due to the removal of the load from the crane and hence the reduction of pressure on the oil 18. The position of the switch 32 is vertically adjustable and this position may if desired be shown on a subsidiary dial calibrated in tare weight and/or the switch may be made to actuate high and low warning lamps used in setting it at its correct position in a manner hereinafter described.

The weight of the gravity operated rod 33 rests on the bar 4 only when weighing is not in progress and hence does not introduce an additional load on same.

The electric clutch-brake device G may be of polarized magnetic type and so arranged that the armature 54 attached to the integrator shaft 55 is either attracted to and driven by an input member 56 on the shaft 28" or is attracted to and held stationary by a fixed member 57.

A pointer 34 capable of being re-set to zero is geared from the integrator shaft and registers on a dial 35 the total weight weighed since the pointer was re-set to zero. The pointer 34 can also be made to close warning contacts 36 at a predetermined tonnage.

*Electrical control gear (Fig. 2)*

The electrical components consist of an operator's push button 37, lock out relay 38 with its associated transformers 39, 39' and 40, a time delay unit 41, a crane lock out relay 42, the tare switch 32, the clutch G and the stamper 43, together with the necessary power supplies and warning lights 46, 47.

Referring to the diagram when more than the tare weight is on the crane, the tare switch 32 closes the contacts 32', 32 connecting the A. C. supply 44 to the rectifier 45. When the operator's push button 37 is depressed, an electromagnet associated therewith maintains the button in the closed position.

The transformers 39, 39' are connected to an A. C. supply source by way of switches (not shown) controlled by the hoist and luffing motors respectively in such manner that when hoisting or luffing is in operation the respective transformer is de-energised. The transformer 40 is permanently energised and when transformers 39, 39' are de-energised, the voltage relay 38 receives sufficient voltage to operate and close its contacts 38'. The transformers 39, 39' have their secondary windings connected in opposition to transformer 40, the secondary voltages being chosen such that the lock-out relay 38 receives a sufficient voltage for operation when transformer 40 only is energised. As soon as the voltage lock-out relay 38 has closed its contacts 38' and providing the operator's push button 37 has previously been depressed, then the time delay unit 41, the crane lock-out relay 42 and the stamper 43 are all energised. The energising of the crane lock-out relay 42 disconnects normally closed contacts 42' which are in the hoisting and luffing motor circuits.

The time delay unit 41 may be of the resistance-capacity charge type although any other suitable form of timer may be substituted. The main relay coil 58 is energised through the resistor 59 but the current growth in 58 is retarded by the condenser 60 of high capacity.

After the time delay has elapsed, the relay 41 operates and in doing so transfers the supply from the brake coil 57' to the clutch coil 56' in the clutch-brake device G and de-energises the crane lock-out relay 42, thus allowing the crane motions to re-start. At the same time a switch arm 41' in the time delay relay 41 short circuits the lock-out relay contacts 38' rendering this part of the circuit inoperative until the next cycle.

As the load is discharged the tare switch 32 reverts to its original position, thus disconnecting the clutch coil 56' and energising the brake coil 57' of the clutch G.

The tare switch 32 also opens the contacts 32', 32" thus disconnecting the supply 44 from the operator's push button 37, the time delay 41 and the stamper 43. The operator's push button therefore re-sets itself, and time delay relay reverts to its original position and the stamper stamps the paper on being de-energised.

Until the load is discharged the operator's push button is held in the depressed condition by the solenoid 37' so that it is impossible for a second weighing to occur.

In order that the tare switch 32 may be set in its correct position, two tare indicator lights 46 and 47 are provided. With only the tare weight on the crane, the operator adjusts the vertical position of the tare switch 32 until slight movement of the switch either way lights either the light 46 or 47.

I claim:

1. Automatic weighing gear for a crane incorporating a load balancing unit comprising a piston, a liquid-containing cylinder, a flexible diaphragm therebetween, a relay valve, mechanical connecting means between said piston and said valve, a source of pressure liquid, a weighing liquid-containing cylinder, a connecting duct between said latter cylinder and said former cylinder, a piston in said latter cylinder, a spring associated with said latter cylinder, apparatus compensating for departure from specified rate and linearity of said spring and for variations in weight of rope between load and load balancing unit, gross weight indicating apparatus, net load measuring apparatus connected thereto by means for deducting the tare weight from the gross load and net load integrating apparatus comprising a high-speed-acting clutch and a switch for controlling action of said clutch co-acting with said compensating apparatus.

2. Automatic weighing gear as set forth in claim 1, wherein said flexible diaphragm is supported on one side by fluid pressure, and said piston subjected to thrust from load being weighed for supporting the other side of the diaphragm, an oil pump for maintaining said fluid pressure, and said relay valve being responsive to movement of said piston to maintain said piston positionally balanced, said weighing unit measuring said fluid pressure.

3. Automatic weighing gear as set forth in claim 2, wherein said weighing unit comprises an axially fixed piston, a weighing cylinder slidably engaging said fixed piston and a spring acting to oppose axial motion of said weighing cylinder under fluid pressure transmitted to the latter from said load balancing unit.

4. Automatic weighing gear as set forth in claim 3, wherein driving means are provided for rotating said axially fixed piston continuously to avoid static frictional effects.

5. Automatic weighing gear as set forth in claim 1, wherein said compensating apparatus comprises a bell crank lever the pivot of which is constrained by said weighing unit to move through distances approximately proportional to load being weighed, and a cam member along which the end of one arm of said lever is constrained to slide, whereby the end of the other arm of said lever moves through distances exactly proportional to the load being weighed.

6. Automatic weighing gear as set forth in claim 1, adapted for use in conjunction with a crane, wherein said compensating apparatus comprises a bell crank lever the pivot of which is constrained by said weighing unit to move through distances approximately proportional to load carried by the crane, said load including unbalanced hoisting rope comprised by the crane, a cam member along which the end of one arm of said lever is constrained to slide, said cam member being shaped to compensate for inaccuracies of said weighing unit, an adjustable support for said cam member, and means including a nut and a threaded member adapted to be turned in synchronism with relative movements of said hoisting rope to move said cam member, whereby the end of the other arm of said lever is constrained to move through distances exactly proportional to load carried by the crane excluding said unbalanced hoisting rope.

7. Automatic weighing gear as set forth in claim 1, adapted for use in conjunction with a crane, wherein clutch means is of the electromagnetic type, said weighing gear comprising a manual switch for closing said clutch means and an adjustable trip switch for opening said clutch means during an unloading operation, means including a solenoid being provided in association with said manual switch for maintaining the latter in the closed position during a weighing operation.

8. Automatic weighing gear for a crane incorporating a load balancing unit comprising a piston, a liquid-containing cylinder, a flexible diaphragm therebetween, a relay valve, mechanical connecting means between said piston and said valve, a source of pressure liquid, a weighing liquid-containing cylinder, a connecting duct between said latter cylinder and said former cylinder, a piston in said latter cylinder, a spring associated with said latter cylinder, apparatus compensating for departure from specified rate and linearity of said spring and for variations in weight of rope between load and load balancing unit, gross weight indicating apparatus, net load indicating apparatus connected thereto by means for deducting the tare weight from the gross load and net load integrating apparatus comprising a high-speed-acting clutch and a switch for controlling action of said clutch co-acting with said compensating apparatus.

FREDERICK DAVID MINORS GAMBLE.

References Cited in the file of this patent
UNITED STATES PATENTS

| Number | Name | Date |
|---|---|---|
| 1,023,154 | Kenerson | Apr. 16, 1912 |
| 1,411,991 | Doran | Apr. 4, 1922 |
| 2,085,345 | Tuttle | June 29, 1937 |
| 2,302,458 | Miner | Nov. 17, 1942 |
| 2,505,237 | Dwyer | Apr. 25, 1950 |